United States Patent
Akester

(10) Patent No.: US 10,481,852 B2
(45) Date of Patent: Nov. 19, 2019

(54) DISPLAY DATA PROCESSING

(71) Applicant: Richard Akester, Cambridge (GB)

(72) Inventor: Richard Akester, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/306,520

(22) PCT Filed: May 26, 2017

(86) PCT No.: PCT/GB2017/051509
§ 371 (c)(1),
(2) Date: Nov. 30, 2018

(87) PCT Pub. No.: WO2017/207971
PCT Pub. Date: Dec. 7, 2017

(65) Prior Publication Data
US 2019/0179589 A1    Jun. 13, 2019

(30) Foreign Application Priority Data
Jun. 1, 2016 (GB) .................................. 1609605.9

(51) Int. Cl.
G09G 5/36 (2006.01)
G06F 3/14 (2006.01)
G06T 15/00 (2011.01)

(52) U.S. Cl.
CPC .......... *G06F 3/1431* (2013.01); *G06T 15/005* (2013.01)

(58) Field of Classification Search
CPC ..... G06F 3/1423; G06F 3/1431; G09G 5/363; G09G 2350/00; G09G 2370/06; G06T 15/005
USPC .................................................... 345/1.1, 501
See application file for complete search history.

(56) References Cited

U.S. PATENT DOCUMENTS

| | | | |
|---|---|---|---|
| 9,424,586 B1* | 8/2016 | Sivertsen | G06Q 30/0241 |
| 2004/0075623 A1 | 4/2004 | Hartman | |
| 2009/0160731 A1* | 6/2009 | Schuler | G06F 3/1423 345/1.1 |
| 2015/0138210 A1* | 5/2015 | Amar | G06T 1/20 345/506 |
| 2015/0356953 A1 | 12/2015 | Modrzyk et al. | |

FOREIGN PATENT DOCUMENTS

| | | |
|---|---|---|
| EP | 2530582 | 12/2012 |
| JP | 2005292677 | 10/2005 |

* cited by examiner

*Primary Examiner* — Jacinta M Crawford

(74) *Attorney, Agent, or Firm* — Haynes and Boone, LLP

(57) ABSTRACT

Display Data Processing A display system for displaying display data includes a host device a plurality of display control devices and a plurality of display devices at least two of the display devices having different characteristics. Depending on the available bandwidth and the required processing operations (e.g. rendering), the host device determines a subset of the processing steps that are to be performed by the display control devices instead by the host itself, so has to reduce the required data transmission bandwidth between the host and the displays.

20 Claims, 7 Drawing Sheets

DISPLAY DATA PROCESSING

CROSS-REFERENCE TO RELATED APPLICATIONS

This application is a U.S. national stage application under 35 U.S.C. § 371 of International Patent Application No. PCT/GB2017/051509, filed on May 26, 2017, which claims the benefit of Great Britain Patent Application No. 1609605.9 filed on Jun. 1, 2016, the contents of each of which are incorporated herein by reference in their entirety.

BACKGROUND

In 3D graphical processing, there are a number of display data processing steps which are conventionally run on a computing device which has generated display data, commonly known as a host device, prior to the finished display data being transmitted to a connected display device for display. Because the host device has a limited capacity for such processing, the number of varied display devices that can be connected and supplied with data is necessarily limited.

Shaders are sets of pre-generated standard instructions which are conventionally run entirely on the host device at each step in the display data processing pipeline. Each application or other graphics producer on a host device may run its own instance of a standard shader simultaneously in a multiplexed system controlled by the Graphical Processing Unit (GPU) of the host device.

Since the shaders may handle different parts of the display data processing pipeline, they have different purposes. Vertex shaders take vertices as input and perform transformations on them such as rotation and scaling. Geometry shaders take primitives such as shapes and lines as input and modify them prior to rasterization, which converts vertices to pixels. Pixel shaders, sometimes also known as Fragment shaders, take pixel data as input and produce pixel output which has been blended, lit, etc.

Because all such processes are carried out on the host device, there is a processing bottleneck on the host device which makes it more difficult to connect multiple display devices or especially large display devices. The invention aims to mitigate this problem.

SUMMARY OF THE INVENTION

Therefore according to first aspect, the invention provides a host device for use in a display system for displaying display data, the display system comprising a host device, a plurality of display control devices and a plurality of display devices, at least two of the display devices having different characteristics, each display control device of the plurality of display control devices being connected to the host device and to a respective display device, wherein the display data is processed in a display data processing pipeline receiving an initial input of coded display data at the host device and generating a final output of rendered display data at each display control device for transmittal to a respective display device for display, the display data processing pipeline including a plurality of serially connected display data processing steps performed on the display data, wherein the host device is configured to:

determine the characteristics of each of the display devices connected to each of the display control devices to determine characteristics of the rendered display data to be transmitted from the final output of the display data processing pipeline to the particular display device;

determine processing capabilities of each of the display control devices connected to the host device;

determine, based on at least the determined characteristics of the rendered display data required for a particular display device and on the processing capabilities of a particular display control device connected to the particular display device, a subset of the plurality of serially connected display data processing steps that are to be performed by the particular display control device, the subset ending at the final output;

perform all the display data processing steps from the initial input to a display data processing step performed prior to the subset of the plurality of serially connected display data processing steps to generate part-processed data; and outputting the part-processed display data to the particular display control device to enable the particular display control device to perform the subset of the plurality of serially connected display data processing steps ending at the final output.

Preferably, each display data processing step is performed on a corresponding display data processing engine executing a selected shader program.

In one embodiment, the host device comprises all the display data processing engines required for the display data processing pipeline.

The host device may, preferably, be configured to determine a number of display data processing engines located on the particular display control device based on the processing capabilities of the particular display control device to determine the subset of the plurality of serially connected display data processing steps that are to be performed by the particular display control device.

Preferably, the host device is configured to select a shader program for each of the display data processing engines in the subset of the plurality of serially connected display data processing steps that are to be performed by the particular display control device and to transmit instructions to the particular display control device to control the particular display control device to execute the selected shader program on the corresponding display data. In one embodiment, the host device is configured to transmit the selected shader program to the particular display control device if the particular display control device does not already have the selected shader program stored in memory.

According to a second aspect, the invention provides a display control device for use in a display system, the display system comprising a host device, a plurality of display control devices and a plurality of display devices, at least two of the display devices having different characteristics, each display control device of the plurality of display control devices being connected to the host device and to a respective display device, wherein the display data is processed in a display data processing pipeline receiving an initial input of coded display data at the host device and generating a final output of rendered display data at each display control device for transmittal to a respective display device for display, the display data processing pipeline including a plurality of serially connected display data processing steps performed on the display data, wherein the display control device is configured to:

transmit to the host device the characteristics of the display device connected to the display control device to enable the host device to determine characteristics of the rendered display data to be transmitted from the final output of the display data processing pipeline to the particular display device;

transmit to the host device processing capabilities of the display control device;

receive, from the host device, information regarding a subset of the plurality of serially connected display data processing steps that are to be performed by the display control device, the subset ending at the final output;

receive, from the host device, part-processed display data to enable the display control device to perform the subset of the plurality of serially connected display data processing steps;

perform the display data processing steps in the subset of the plurality of serially connected display data processing steps on the part-processed display data to generate the rendered display data; and transmit the rendered display data to the display device connected to the display control device.

Preferably, each display data processing step is performed on a corresponding display data processing engine executing a selected shader program.

In one embodiment, the display control device comprises fewer than all the display data processing engines required for the display data processing pipeline.

The display control device may, preferably, be configured to receive instructions from the host device to execute a selected shader program on a corresponding display data processing engine to process the display data, the selected shader program being selected by the host device for each of the display data processing engines in the subset of the plurality of serially connected display data processing steps that are to be performed by the display control device.

Preferably, the display control device is configured to receive the selected shader program from the host device if the display control device does not already have the selected shader program stored in memory.

According to a third aspect, the invention provides a display system comprising a host device as described above, a plurality of display control devices and a plurality of display devices, at least two of the display devices having different characteristics, each display control device of the plurality of display control devices being connected to the host device and to a respective display device, each display control device of the plurality of display control devices being as described above.

According to a fourth aspect, the invention provides a method of displaying display data on a display system comprising a host device, a plurality of display control devices and a plurality of display devices, at least two of the display devices having different characteristics, each display control device of the plurality of display control devices being connected to the host device and to a respective display device, wherein the display data is processed in a display data processing pipeline receiving an initial input of coded display data at the host device and generating a final output of rendered display data at each display control device for transmittal to a respective display device for display, the display data processing pipeline including a plurality of serially connected display data processing steps performed on the display data, the method comprising:

determining, at the host device, the characteristics of each of the display devices connected to each of the display control devices to determine characteristics of the rendered display data to be transmitted from the final output of the display data processing pipeline to the particular display device;

determining, at the host device, processing capabilities of each of the display control devices connected to the host device;

determining, at the host device, based on at least the determined characteristics of the rendered display data required for a particular display device and on the processing capabilities of a particular display control device connected to the particular display device, a subset of the plurality of serially connected display data processing steps that are to be performed by the particular display control device, the subset ending at the final output;

performing, at the host device, all the display data processing steps from the initial input to a display data processing step performed prior to the subset of the plurality of serially connected display data processing steps to generate part-processed data; and outputting, from the host device, the part-processed display data to the particular display control device to enable the particular display control device to perform the subset of the plurality of serially connected display data processing steps ending at the final output.

Preferably, each display data processing step is performed on a corresponding display data processing engine executing a selected shader program.

In one embodiment, the method further comprises:

determining, by the host device, a number of display data processing engines located on the particular display control device based on the processing capabilities of the particular display control device to determine the subset of the plurality of serially connected display data processing steps that are to be performed by the particular display control device.

Preferably, the method further comprises:

selecting, by the host device, a shader program for each of the display data processing engines in the subset of the plurality of serially connected display data processing steps that are to be performed by the particular display control device; and transmitting, by the host device, instructions to the particular display control device to control the particular display control device to execute the selected shader program on the corresponding display data processing engine to process the display data.

The method may further comprise:

transmitting, by the host device, the selected shader program to the particular display control device if the particular display control device does not already have the selected shader program stored in memory.

Preferably, the method further comprises:

transmitting, by the display control device to the host device, the characteristics of the display device connected to the display control device to enable the host device to determine characteristics of the rendered display data to be transmitted from the final output of the display data processing pipeline to the particular display device;

transmitting, by the display control device to the host device, the processing capabilities of the display control device;

receiving, by the display control device from the host device, the information regarding the subset of the plurality of serially connected display data processing steps that are to be performed by the display control device;

receiving, by the display control device from the host device, the part-processed display data;

performing, by the display control device, the display data processing steps in the subset of the plurality of serially connected display data processing steps on the part-processed display data to generate the rendered display data; and transmitting, by the display control device, the rendered display data to the display device connected to the display control device.

In an embodiment, the method further comprises:

receiving, at the display control device, the instructions from the host device to execute the selected shader program on the corresponding display data processing engine to process the display data.

Preferably, the method further comprises:

receiving, at the display control device, the selected shader program from the host device if the display control device does not already have the selected shader program stored in memory.

In another aspect, the invention provides a computer readable medium including executable instructions which, when executed in a processing system, cause the processing system to perform all the steps of a method as described above.

According to a further aspect, there is provided a method of co-ordinating a split display pipeline in which incompletely processed display data may be sent from a host to a display control device with a programmable processor and the display control device may then perform the remaining processing to prepare the display data for display. The method comprises:

1. The display control device notifying the host of its processing capabilities
2. The host carrying out some processing and/or data generation
3. The host transmitting appropriate shaders to the display control device
4. The host transmitting data and commands to the display control device
5. The display control device carrying out the instructions in the appropriate shader(s) on the data
6. The display control device transmitting the data to a connected display device for display.

The capabilities of the display control device may include the processing power of the programmable processor, the memory available for shaders, the presence of any specialised hardware, the bandwidth available between the display control device and the display device, or any similar measure of ability to carry out additional processing.

The commands sent to the display control device by the host may include instructions to use a particular shader for particular data, as well as any appropriate flags and parameters, such as which of multiple display devices is or are to be used for displaying the finished image data.

The data sent to the display control device may be display data at any appropriate point in generation and processing. It may include, for example, vertices, primitives, and textures.

As is suggested by the transmission of data and commands to the display control device once the shaders have been transmitted, each shader is uploaded to the display control device once and then used repeatedly. This may be done at the beginning of the link, or repeated throughout the life of the link if, for example, more capability becomes available on the display control device and it therefore becomes possible to upload further shaders in addition to those already present.

An example embodiment could comprise the following steps:

1. The host registering a shader using a unique identifier;
2. The host querying the resources of the display control device to ensure it can run the shader;
3. If so, the host uploading the shader to the display control device and notifying it of the shader's unique identifier;
4. The host sending primitive or partially-processed data to the display control device for processing with the shader, using the shader's unique identifier;
5. The display control device processing the data using the shader;
6. The display control device sending the data for display.

The method described above may reduce the amount of processing carried out on the host, as well as providing a potential compression advantage depending on the stage in the pipeline where data is sent to the display control device. Because less processing may be carried out on the host, the host is more likely to be able to supply multiple display control devices with data, especially if they are showing similar images, as is likely in a desktop setting. Furthermore, if the host device were a battery powered device, such as a mobile device, but the display control device was main-powered, or at least with a greater degree of power available than the host device, then off-loading more of the pipeline to the display control device would result in power savings for the host device and therefore in battery life. Indeed, the amount of battery life left for the mobile may even be considered by the host device when determining how much of the pipeline to offload to the display control device.

As an extension of the above method, multiple hosts may be connected to a single display control device. Provided the hosts are aware of one another and are able to reference the appropriate shaders without confusion, the same process can be followed for each connection between a host and the display control device. The display control device need not be aware that the data and accompanying instructions and requests are sent by multiple hosts, as this case is the same as if they were sent by multiple programs on a single host.

BRIEF DESCRIPTION OF THE DRAWINGS

Embodiments of the invention will now be more fully described, by reference to the drawings, of which.

DETAILED DESCRIPTION OF THE DRAWINGS

Figure 1:
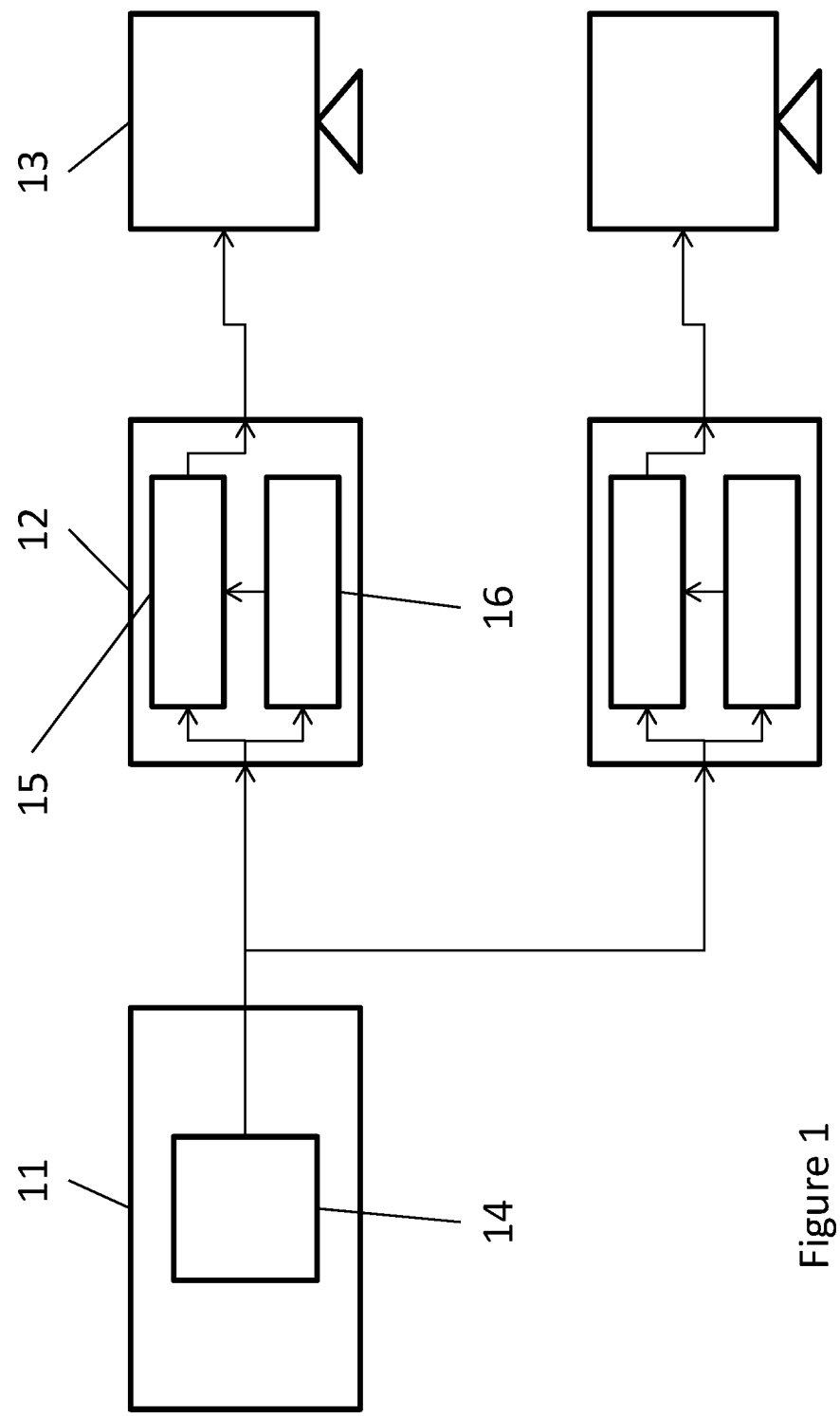
FIG. 1 shows an example system comprising a host, two display control devices, and connected display devices.

FIG. 1 shows a host [11] arranged to produce display data for display according to internal instructions. This function will most likely be carried out in the Graphics Processing Unit (GPU) [14] of the host [11], but may be in any internal processor or processors. It is connected to two display control devices [12] which may be embodied, for example, as display adapters. The connections between the host [11] and the display control devices [12] may be wired or wireless, and may utilise a display-specific connection method (such as DVI, or HDMI) or a general-purpose one, such as, for example, a Universal Serial Bus (USB). The latter is more likely, as a computing device is more likely to have output ports for general-purpose data than display data, but the methods of the invention can be applied in either case. The connection may also be over a network, including the internet, and different connections may use different methods.

Each display control device [12] contains its own internal processor [15], as well as a memory [16], in which instructions and data are stored. These are transmitted by the host [11] across the connection and directed to memory [16] for storage. Commands are also transmitted across the connection, but these are sent directly to the processor [15], which then fetches the required data and instructions from the memory [16]. Naturally, especially if multiple display data processing steps are being carried out on the display control device [12] then data can be returned to memory [16] in between instructions, but the direction of data flow shown in FIG. 1 assumes that data and instructions are being fetched from memory [16] and not returned to it.

The processor [15] is likely to consist of multiple processing cores so that instructions can be run in parallel, and may in fact consist of multiple separate processors. However, for simplicity, the processor [15] is described herein as a single processor [15] regardless of its actual arrangement. As suggested by the fact that instructions may be run in parallel, when additional shaders are present on the display control device [12], different processor cores may simultaneously be running the shaders associated with different display data processing steps, but the processes described herein will refer to a single serially-arranged pipeline.

Furthermore, the processor [15] may consist of or include a collection of display data processing engines, each of which is specifically designed to carry out a particular purpose and run a particular corresponding type of shader. Such engines will be described again in more detail with reference to later Figures, but are collectively described as the processor [15].

Each display control device [12] is then connected to a display device [13]. The display devices [13] are likely to have different characteristics, such as size, resolution, frame update speed, colour depth, etc., meaning that display data destined for the two displays will require different processing. When processing of data is complete, the resulting image data is transmitted along this connection for display on the display device [13]. This connection will carry display-specific data, but it may also be wired or wireless. Any one or more of the devices [11, 12, 13] may be co-located with another one or more, where two co-located devices share a single casing and appear to be one device.

Figure 2:
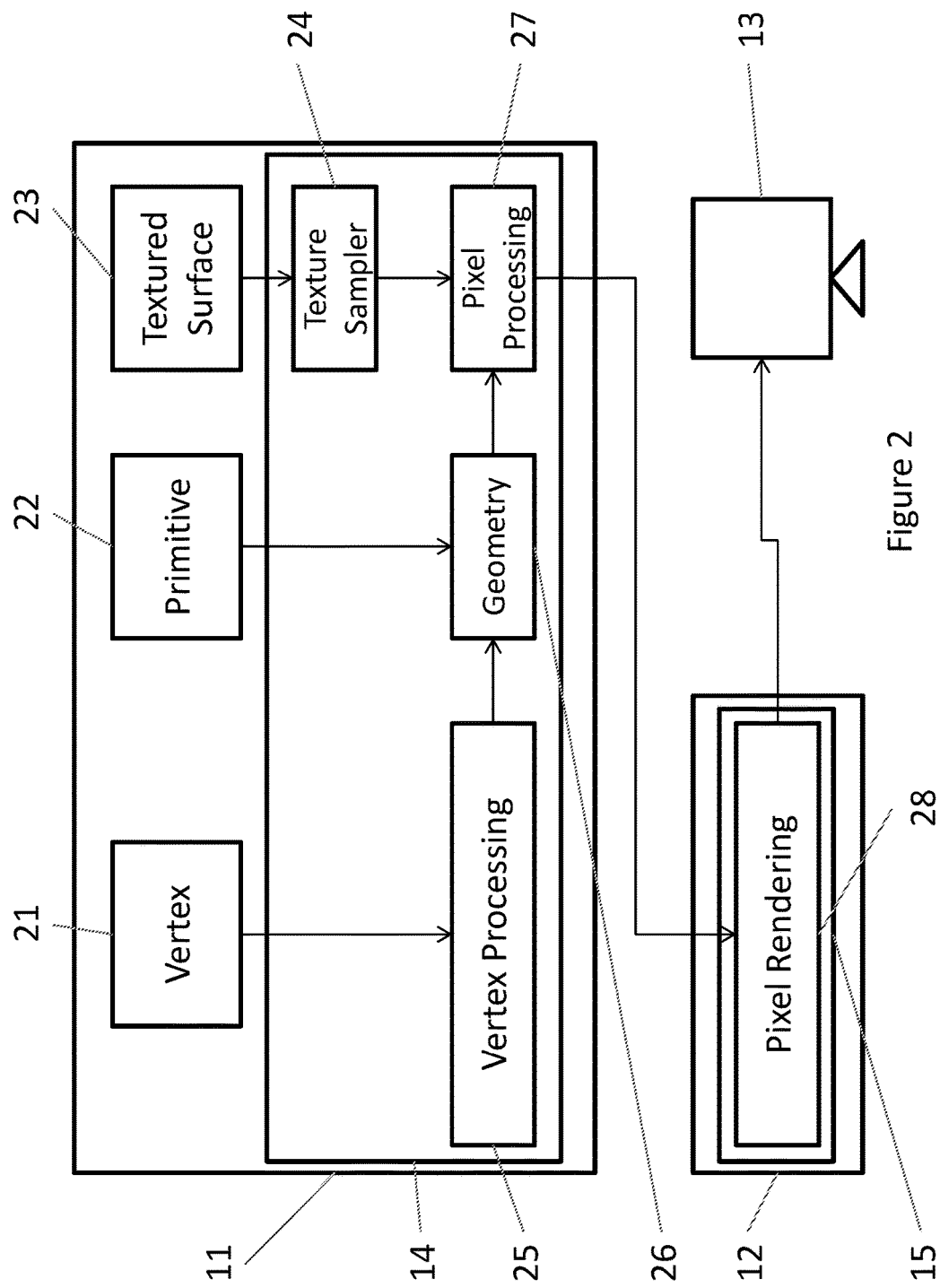
FIG. 2 shows a basic schematic of relevant functionality on a host and one display control device arranged according to the current art.

FIG. 2 shows a host [11] and one of the display control devices [12] arranged according to the current art. For completeness, the respective connected display device [13] is also shown.

FIG. 2 also shows steps in an example display data processing pipeline as separate software components or engines. These steps will be used throughout FIGS. 2, 3, 4, and 5, and may each be represented by a shader.

1. Generation of primitive data, including vertices, according to instructions on the host
2. Vertex shading: performing functions such as rotation and scaling on primitive vertices
3. Geometry shading: Modification of the vertices and primitives prior to the application of textures
4. Texture sampling: Selection and modification of pre-generated textures, including colours
5. Pixel shading: Application of textures to vertices in order to produce pixel data At the end of the pipeline, the pixel data is rendered and output to the display device.

This pipeline is an example for convenience only. Other pipelines may include more, fewer, or different steps.

Conventionally, the majority of display data processing is carried out on the host [11], as shown in FIG. 2, and correspondingly the host may have a complete collection of the required display data processing engines. The various display data processing steps shown here will most likely be run in the GPU [14] on the host [11], either on programmable processors or in specific-function engines as previously mentioned, while data is stored in a memory.

Vertices [21] and primitives [22] are generated and stored in memory. Vertices [21] are collections of points stored as co-ordinates, and these are passed to the vertex shader [25], which transforms the vertices as appropriate. Primitives [22] are parts of display data with dimensionality, such as simple shapes which can then be tessellated in order to produce patterns. This is done by the geometry shader [26], with input from the vertex shader [25], as shown in FIG. 2.

The GPU also generates textured surfaces [23], which are transformed textures that are then stored in memory. These are then passed to the texture sampler [24] for sampling, and the resulting textures are combined with the output of the geometry shader [26] in the pixel processing unit [27]. This then produces display data, which is transmitted to the display control device [12] and rendered in its internal processor [15] by a pixel rendering service [28]. This produces image data, which is sent to the display device [13] for display.

The host [11] shown in all other Figures could have the same capabilities as that shown in FIG. 2, including appropriate display data processing engines, and use different capabilities as the situation requires. However, for clarity, only those display data processing steps actually being run on the host [11] in each case will be shown.

Figure 3:
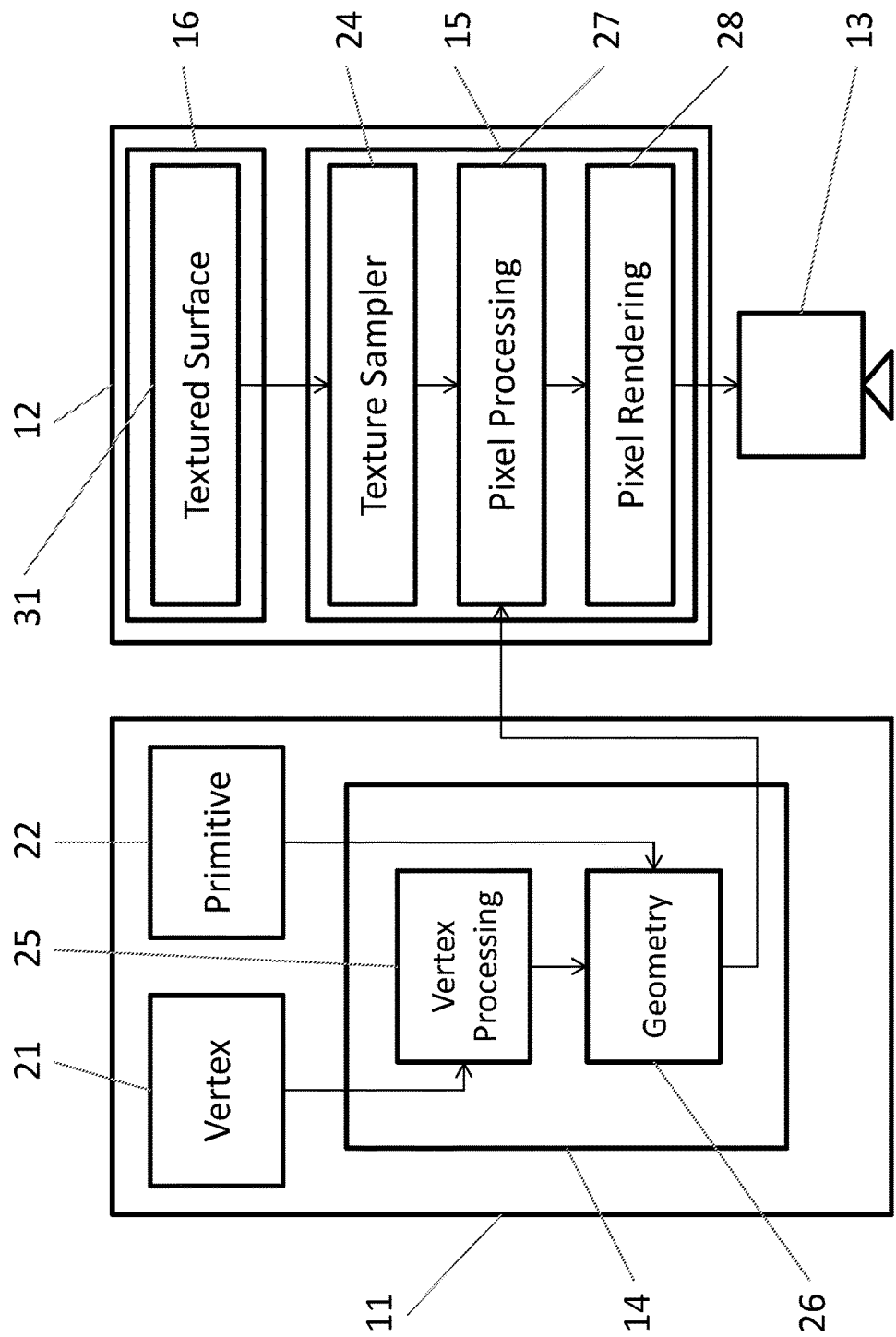
FIG. 3 shows a basic schematic of relevant functionality on a host and one display control device in an arrangement by which the pixel shader has been offloaded to the display control device.

FIG. 3 shows a similar host [11], display control device [12], and display device [13], but in this case they are arranged according to an embodiment of the invention. The vertex [21] and primitive [22] data are still stored in memory on the host [11], and the vertex [25] and geometry [26] shading are still carried out in the GPU [14] as previously described. However, a subset of the display data processing pipeline has been offloaded to the display control device, together with appropriate partially-processed data.

After being generated on the host [11] the textured surfaces [31] have been sent to the display control device [12] and are stored in memory [16]. This means that when the geometry shading [26] is complete, the shaded data can be transmitted to the display control device [12], where pixel shading [27] is carried out, since the textures [31] are also sampled [24] on the display control device [12]. The display data can then be rendered into image data and transmitted to the display device [13] as if it had been generated and processed in the conventional way.

This reduces the amount of processing that must be carried out on the host [11] and may result in a smaller volume of data being transmitted to the display control device [12] if, for example, textures have not yet been applied at the time the data is transmitted. This may be beneficial where the bandwidth of the connection between the host [11] and the display control device [12] is limited. Compression may be applied to the data as it is transmitted from the host [11] to the display control device [12], which is not done at this stage in the pipeline in the current art as conventionally the whole pipeline is contained on a single device. In many cases, however, there will be greater benefits from compression partway through the pipeline, meaning that a system arranged according to the invention may make more efficient use of a limited-bandwidth connection.

Figure 4:
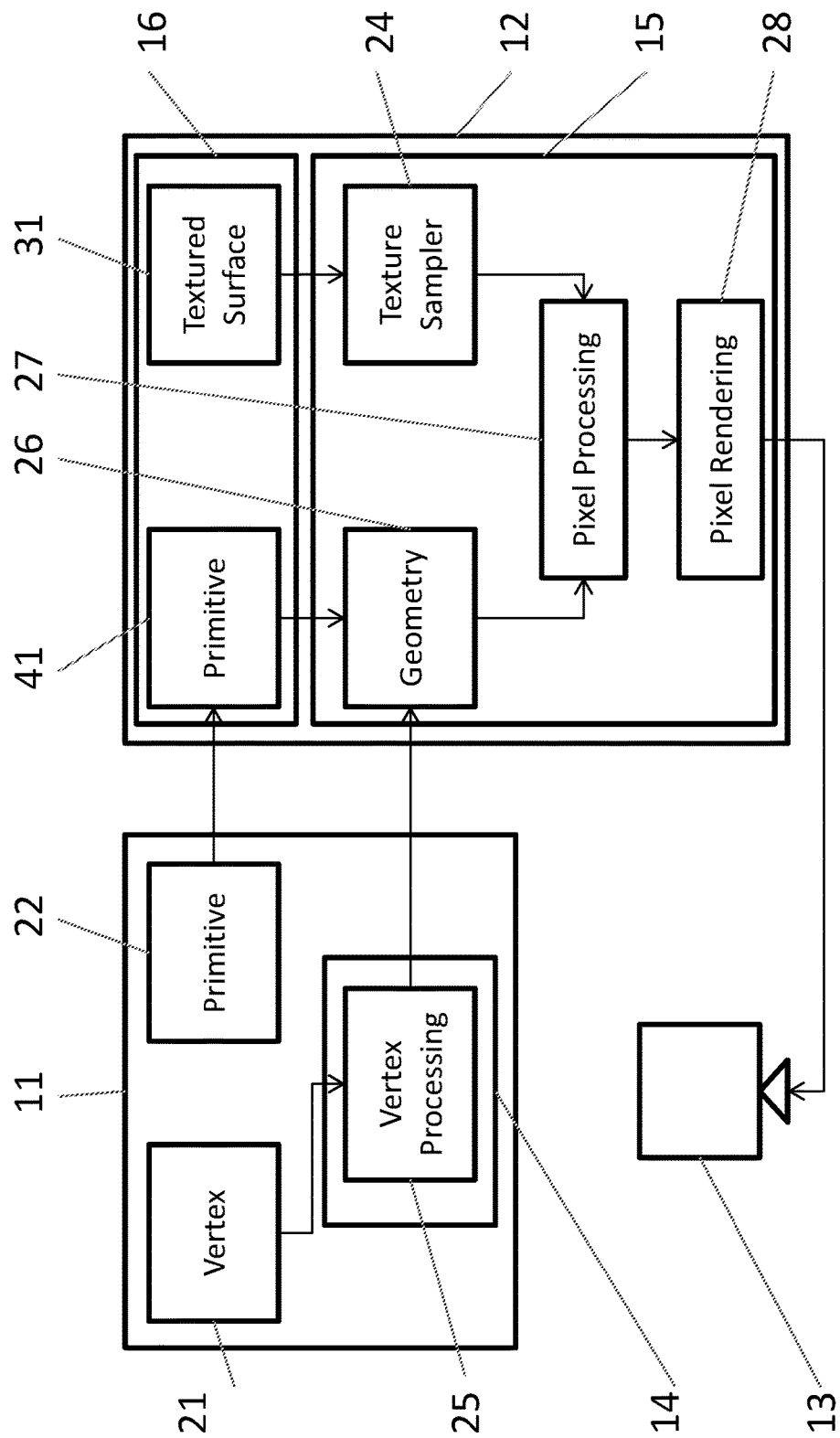
FIG. 4 shows a basic schematic of relevant functionality on a host and one display control device in an arrangement by which the geometry and pixel shaders have been offloaded to the display control device.

FIG. 4 shows a further embodiment of a system according to the invention. In this case, both the textured surfaces [31] and the primitives [41] have been transmitted to the display control device [12], and these are stored in memory [16] on the display control device [12]. The instructions comprising the geometry shader [26] have also been transmitted. As a result, the geometry shader [26], texture sampler [24], and pixel shader [27] are all run by the processor [15] on the display control device [12], prior to the resulting display data being rendered and sent as image data to the display device [13] in the conventional way. Only the vertex shader [25] is run in the GPU [14] on the host [11].

Figure 5:
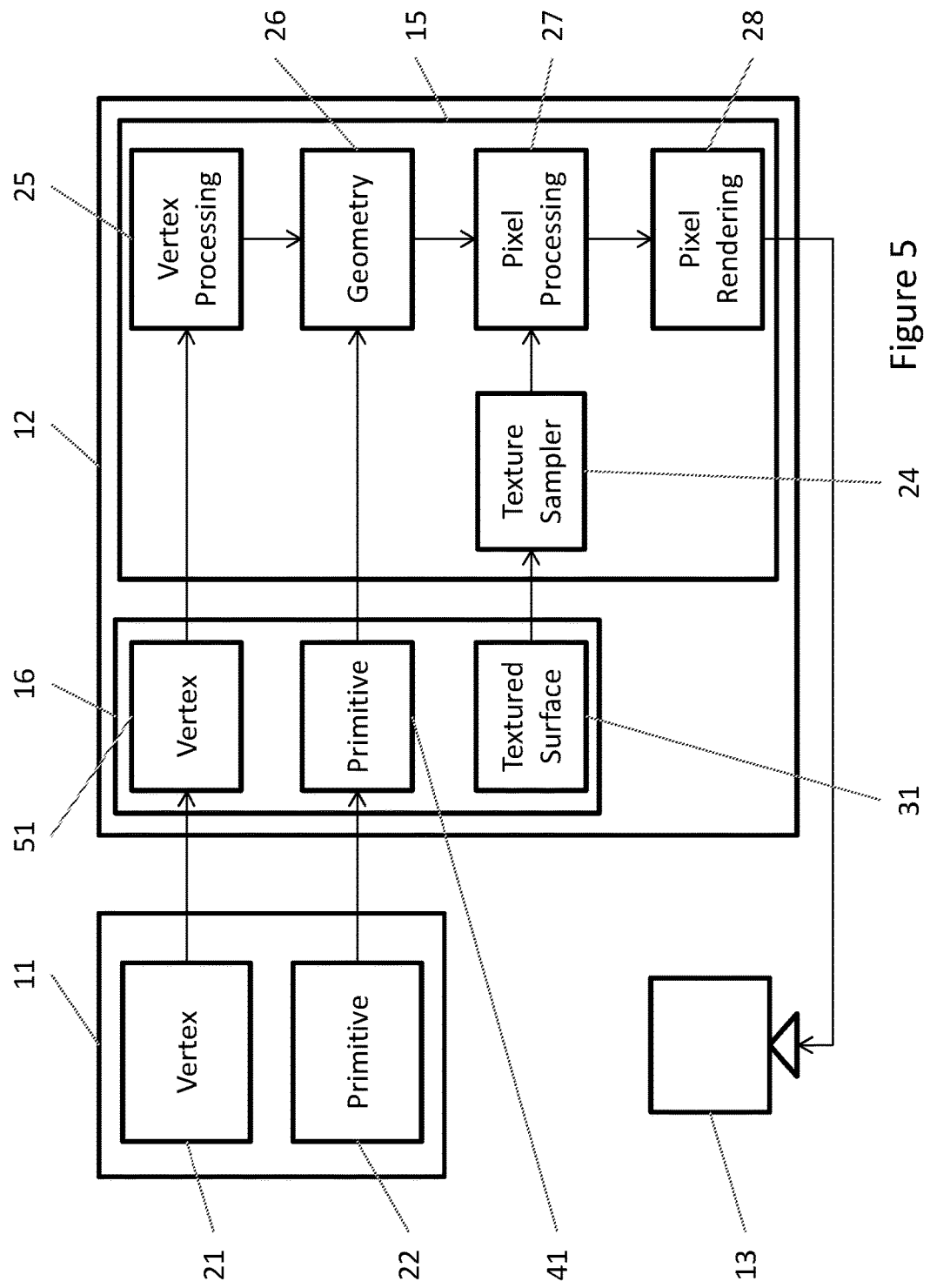
FIG. 5 shows a basic schematic of relevant functionality on a host and one display control device in an arrangement by which the vertex, geometry, and pixel shaders have been offloaded to the display control device.

FIG. 5 shows a final embodiment, in which all the shaders [24-7] are run on the processor [15] in the display control device [12]. As a result, both the vertices [51] and the primitives [41], having been generated [21, 22] on the host [11], are transmitted to the display control device [12] and stored in memory [16] along with the textured surfaces [31]. The instructions comprising the vertex, geometry, and pixel shaders [25, 26, 27] and the texture sampler [24] are also transmitted and these are run on the data [31, 41, 51] stored in memory [16] as previously described with regard to the host [11]. Finally, the display data is rendered to image data and transmitted to the display device [13] in the conventional way.

In each of FIGS. 3, 4, and 5, only one display control device [12] is shown. Different levels of offloading may be used by the host [11] for different display control devices [12] in the same system, such that in the system shown in FIG. 1 where there are two display control devices [12]. The interaction between the host [11] and the first display control device [12] may be like that shown in FIG. 3, in which only the pixel shading step [27] is offloaded to the display control device [12]. Meanwhile, the interaction between the host [11] and the second display control device [12] may be like that shown in FIG. 5, in which all the display data processing is performed on the display control device [12] apart from the initial generation of the primitives [21, 22]. Naturally, there may also be other combinations, including both display control devices [12] performing the same level of processing, perhaps using different shaders, and the pipeline may be split in other ways as appropriate.

Figure 6:
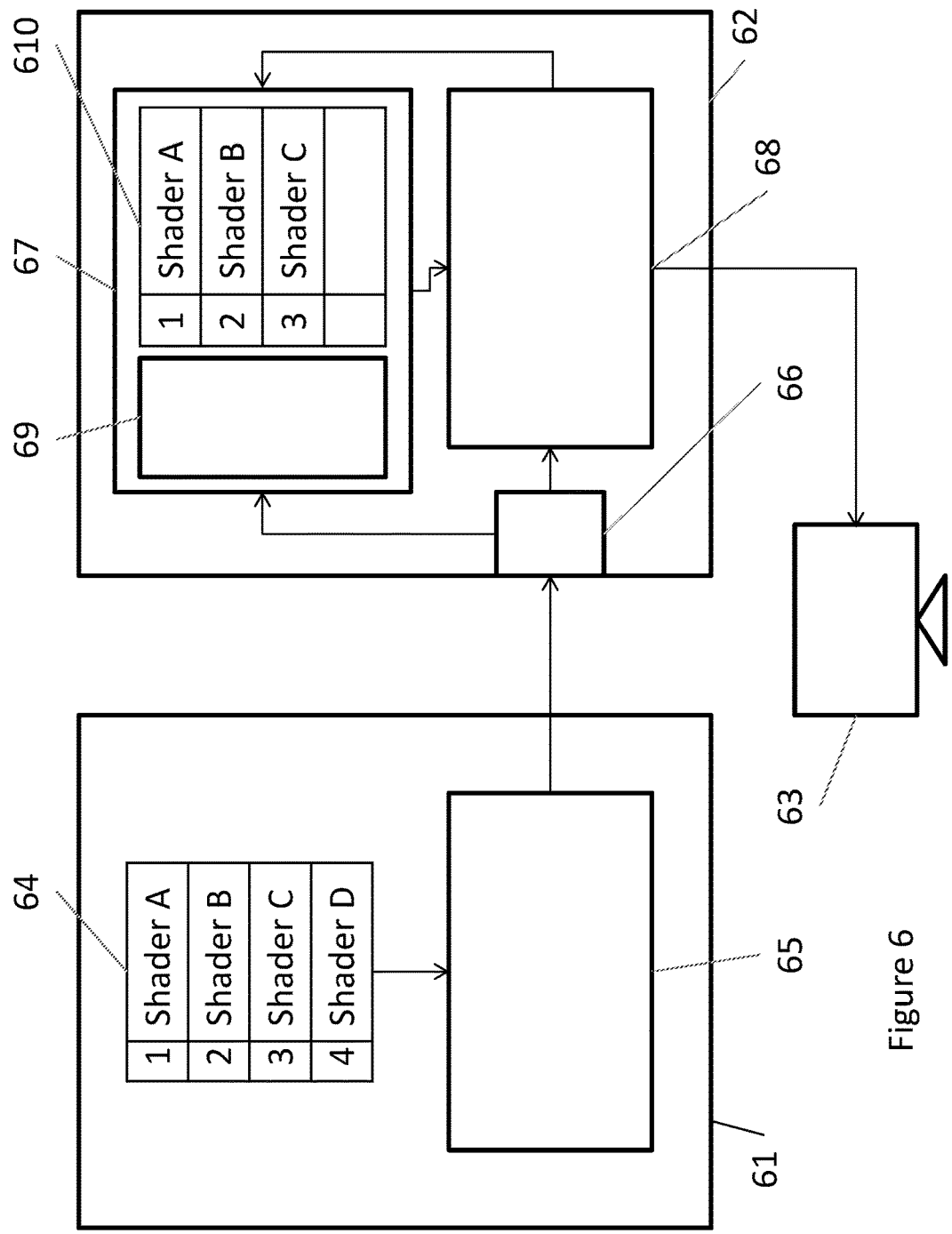
FIG. 6 shows a basic schematic of an example host and display control device showing relevant memory and processors.

FIG. 6 shows an example of a basic schematic of a host [61], display control device [62], and display device [63]. This schematic may run the relevant display data processing steps in any configuration shown in any of FIG. 2, 3, 4, or 5.

The host [61] will include other components, but those relevant to the invention are a memory [64] which contains shaders and a processor [65], which may, as previously mentioned, actually comprise a collection of one or more display data processing engines: possibly all those required for the full pipeline as shown in FIG. 2. In this example, the host processor [65] handles the connection and all communication with the display control device [62], although in practice there is likely to also be an output engine that handles the actual communication by, for example, converting data to an appropriate communication format and transmitting it. For the purposes of this description, data is sent directly from the host processor [65] to the display control device [62].

The display control device [62] is also likely to include other components, but only three are shown in FIG. 6 for the purposes of clarity. These are, first, an input engine [66], which receives signals and data from the host [61] and handles them as appropriate, for example by sending further signals or removing any transmission formatting added by the host [61], such as packet headers. The input engine [66] is then connected to a memory [67] and a processor [68]. The memory [67] holds shaders [610], along with their unique reference numbers as assigned by the host [61], and data [69]. The shaders [610] may in fact be represented by a lookup table referencing a further, larger memory where the full instructions comprising the shaders are stored while the local memory [67] only holds the unique references and the memory addresses of the instructions, but in the embodiment shown in FIG. 6 the instructions comprising the shaders [610] are stored in the local memory [67]. The memory [67] is also connected to the processor [68] so that the processor [68] can fetch data [69] and instructions [610] from the memory [67] and may also store data [69] in the memory [67] if more processing is required. These two connections are shown as separate for clarity, but in practice are likely to be a single bus.

The display control device processor [68] runs the instructions comprised in shaders on data received by the input engine [66] and stored in memory [69] or passed directly to the processor [68]. The processor may, as previously mentioned, actually comprise a collection of one or more display data processing engines. Unlike the host [61], the display control device [62] does not produce primitives and is highly unlikely to have a full collection of display data processing engines, so it is likely to only be able to perform some of the display data processing steps.

This then produces processed data, which the processor [68] either transmits to the display device [63] for display in the conventional way, or stores in memory [69] so that it can fetch it and run further instructions on it as appropriate. Transmitting finished image data to the display device [63] may involve an output engine to apply formatting and timing appropriate to the display device [63].

Figure 7:
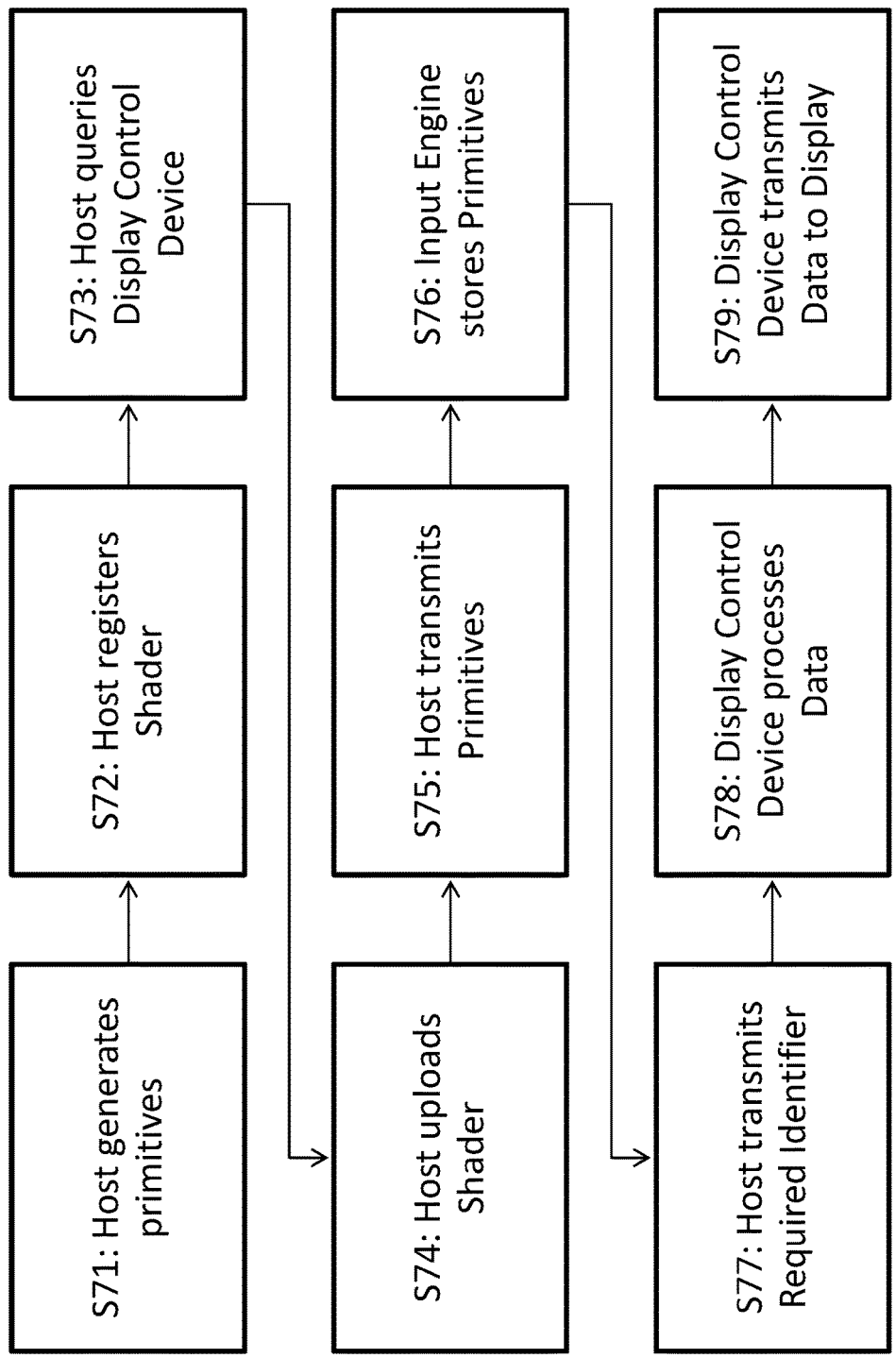
FIG. 7 shows an overview of an example process with reference to FIG. 6.

FIG. 7 shows an overview of an example of the whole process for the host to offload the operation of a shader.

At Step S71, the host [61] generates the primitive image data [22] it will require. As previously mentioned, this may consist of lines, simple shapes such as triangles, and colours. These are stored locally on the host [61].

The host [61] also has at least one shader [64], consisting of instructions to be carried out on display data during a particular display data processing step. It registers the shaders at Step S72, assigning each one a reference number. Examples are shown in FIG. 6: Shader A [64A] has been assigned reference number 1, Shader B [64B] has reference number 2, Shader C [64C] has reference number 3, and Shader D [64D] has reference number 4. If there were multiple hosts [61] connected to a single display control device [62], these identification numbers would also be unique between hosts [61] unless it could be guaranteed that all hosts [61] would use an identical shader.

At Step S73, the host [61] queries the display control device [62] to see what resources it has available for running shaders, as well as to determine the characteristics of the connected display device or devices [63] in order to determine the characteristics of the data that will be sent to them. The available resources on the display control device [62] would include memory for the instructions [610] and the processing power required for an additional program, and also memory [69] available for the inputs required by the program. If appropriate, it could also include availability of display data processing engines. For example, even in the embodiment shown in FIG. 5 where the display control device [12] would be capable of running all the shaders required by the host [11], it will not be possible to offload all the processing unless there is also memory space available for the vertices [51] and primitives [41], together with all the intermediate stages of the data. As a result, all of these attributes must be checked during querying.

Alternatively, the display control device [62] could transmit its capabilities to the host [61] without querying, for example upon connection. This would mean that the appropriate data would already be stored on the host [61] and it could consult this at Step S73.

In the example shown in FIG. 6, the host [61] is querying for the possibility of offloading Shader D [64D]. There is sufficient space in memory [610] on the display control device [62] for an additional shader to be stored, and there is also sufficient processing power and other memory available for it to be run. The host [61] is therefore able to upload the instructions comprising Shader D [64D] to the display control device [62] at Step S74.

The processor [65] on the host [61] fetches the shader [64D] from memory [64] and transmits it to the input engine [66] on the display control device [62], which immediately directs it into the memory [67] on the display control device [62], where it is stored in the area of memory dedicated to program instructions [610]. The host [61] also sends the unique identifier associated with Shader D [64D]—'4', in this example—and this is stored in memory [610] with the shader. It may also be stored with a reference to the shader such as a memory address in a look-up table to provide easy access to each shader using its unique identifier.

Decisions regarding the display data processing steps to be offloaded could be dictated by the characteristics of all the connected display devices [63] such that if they all have particular attributes in common then relevant steps could be most efficiently carried out centrally on the host [61] even if all the display control devices [62] would in fact be capable of performing them. Furthermore, if there are three connected display devices [63] and one is different to the others—for example, it is much larger—the host [61] may determine that a larger subset of the display data processing steps should be carried out on that display device's [63] display control device [62], so that scaling common to the remaining two display devices [63] is performed on the host [61] and the display control device [62] connected to the large display device [63] performs its scaling. In this way, the system is highly flexible for greatest efficiency.

Furthermore, by splitting the pipeline in different ways, different compression methods may be used according to which compression method may be particularly appropriate for the particular partially-processed display data being transferred across from the host to the display control device. Indeed, in some circumstances the host may determine that, although the pipeline could be split in one way so that some processing is offloaded to the display control device as described above, by splitting the pipeline in a different place, better compression may be obtained depending on the partially processed data that is then to be sent, and that such better compression may be preferable to the offloading that would otherwise have been made. Thus, the host could use knowledge of the various compression methods available for different partially processed data and capabilities of the transmission pipeline, such as bandwidth and available resources, when determining where to split the pipeline.

The example being outlined in FIG. 7 assumes a system such as that shown in FIG. 5, in which all shading is offloaded to the display control device [12]. As a result, at Step S75, the host [61/11] sends the generated primitives [22] to the display control device [62/12], where they are stored in memory [51]. In another system, it will transmit partially-shaded display data. The incoming data will be stored in memory [69] on the display control device [62/12] at Step S76.

In any case, the host [61] will perform any display data processing steps it has determined should not be offloaded to the display control device [62], and will transmit the part-processed display data to the display control device [62] as described above for the primitive data.

At Step S77, the host [61] transmits the identifiers of the shaders to be applied to the data, preferably in the order in which they are to be applied, but a different ordering scheme may be used. For example, if Shaders A and B are vertex shaders with slightly different functions but which occupy the same display data processing step, Shader C is a geometry shader, and Shader D is a pixel shader, the host [61] may only transmit '4' for a pipeline such as that shown in FIG. 3, in which only pixel processing [27] is carried out on the display control device [12]. Alternatively, it may send the data accompanied by '1, 3, 4' for a pipeline such as that shown in FIG. 5 using Shader A for vertex shading [25], Shader C for geometry shading [26], and Shader D for pixel shading [27]. This introduces flexibility in which shaders are applied in different circumstances.

At Step S78, the processor [68] on the display control device [62] fetches the referenced shader [610] from memory [67] and carries out the instructions contained in it on the primitives or incomplete data transmitted to it, having also fetched these from memory [69]. If there are multiple shaders to be applied, it will repeat this step for all the shaders in the sequence and may move the data in and out of memory [69] between iterations. It may also send feedback to the host [61] on its progress in processing the data, which may allow the host [61] to balance workload, for example between itself and the display control device [62]. This step may involve sending the shaders and data to appropriate display data processing engines within the processor [68], or carrying out the instructions in each shader using a programmable processor [68].

At Step S79, the processing is complete and the display control device [62] transmits the data to the display device [63] for display in the conventional way.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and engines/modules which are described as separate may be combined into single engines/modules and vice versa. Functionality of the engines or other modules may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A host device for use in a display system for displaying display data, the display system comprising a host device, a plurality of display control devices and a plurality of display devices, at least two of the display devices having different characteristics, each display control device of the plurality of display control devices being connected to the host device and to a respective display device, wherein the display data is processed in a display data processing pipeline receiving an initial input of coded display data at the host device and generating a final output of rendered display data at each display control device for transmittal to a respective display device for display, the display data processing pipeline including a plurality of serially connected display data processing steps performed on the display data, wherein the host device is configured to:
 determine the characteristics of each of the display devices connected to each of the display control devices to determine characteristics of the rendered display data to be transmitted from the final output of the display data processing pipeline to the particular display device;
 determine processing capabilities of each of the display control devices connected to the host device;
 determine, based on at least the determined characteristics of the rendered display data required for a particular display device and on the processing capabilities of a particular display control device connected to the particular display device, a subset of the plurality of serially connected display data processing steps that are to be performed by the particular display control device, the subset ending at the final output;
 perform all the display data processing steps from the initial input to a display data processing step performed prior to the subset of the plurality of serially connected display data processing steps to generate part-processed data; and
 output the part-processed display data to the particular display control device to enable the particular display control device to perform the subset of the plurality of serially connected display data processing steps ending at the final output.

2. The host device according to claim 1, wherein each display data processing step is performed on a corresponding display data processing engine executing a selected shader program.

3. The host device according to claim 2, wherein the host device comprises all the display data processing engines required for the display data processing pipeline.

4. The host device according to claim 2, wherein the host device is configured to determine a number of display data processing engines located on the particular display control device based on the processing capabilities of the particular display control device to determine the subset of the plurality of serially connected display data processing steps that are to be performed by the particular display control device.

5. The host device according to claim 4, wherein the host device is configured to select a shader program for each of the display data processing engines in the subset of the plurality of serially connected display data processing steps that are to be performed by the particular display control device and to transmit instructions to the particular display control device to control the particular display control device to execute the selected shader program on the corresponding display data processing engine to process the display data, or wherein the host device is configured to transmit the selected shader program to the particular display control device if the particular display control device does not already have the selected shader program stored in memory.

6. The host device according to claim 1, wherein the part-processed display data is output to the particular display control device in compressed form and wherein the host device is further configured to:
 determine available compression methods for part-processed data at different display data processing steps in the host device and the amount of compressed part-processed display data that would be output if part-processed data at different display data processing steps in the host device were compressed according to different available compression methods; and
 utilise the knowledge of the amount of compressed part-processed display data that would be output from different display data processing steps in the host device compressed according to different available compression methods when determining the subset of the plurality of serially connected display data processing steps that are to be performed by the particular display control device.

7. A display control device for use in a display system, the display system comprising a host device, a plurality of display control devices and a plurality of display devices, at least two of the display devices having different characteristics, each display control device of the plurality of display control devices being connected to the host device and to a respective display device, wherein the display data is processed in a display data processing pipeline receiving an initial input of coded display data at the host device and generating a final output of rendered display data at each display control device for transmittal to a respective display device for display, the display data processing pipeline including a plurality of serially connected display data processing steps performed on the display data, wherein the display control device is configured to:
 transmit to the host device the characteristics of the display device connected to the display control device to enable the host device to determine characteristics of the rendered display data to be transmitted from the final output of the display data processing pipeline to the particular display device;
 transmit to the host device processing capabilities of the display control device;
 receive, from the host device, information regarding a subset of the plurality of serially connected display data processing steps that are to be performed by the display control device, the subset ending at the final output;
 receive, from the host device, part-processed display data to enable the display control device to perform the subset of the plurality of serially connected display data processing steps;
 perform the display data processing steps in the subset of the plurality of serially connected display data processing steps on the part-processed display data to generate the rendered display data; and
 transmit the rendered display data to the display device connected to the display control device.

8. The display control device according to claim 7, wherein each display data processing step is performed on a corresponding display data processing engine executing a selected shader program.

9. The display control device according to claim 7, wherein the display control device comprises fewer than all the display data processing engines required for the display data processing pipeline.

10. The display control device according to claim 7, wherein the display control device is configured to receive instructions from the host device to execute a selected shader program on a corresponding display data processing engine to process the display data, the selected shader program being selected by the host device for each of the display data processing engines in the subset of the plurality of serially connected display data processing steps that are to be performed by the display control device, or wherein the display control device is configured to receive the selected shader program from the host device if the display control device does not already have the selected shader program stored in memory.

11. A display system comprising a host device according to claim 1, a plurality of display control devices and a plurality of display devices, at least two of the display devices having different characteristics, each display control device of the plurality of display control devices being connected to the host device and to a respective display device, each display control device of the plurality of display control devices being according to claim 7.

12. A method of displaying display data on a display system comprising a host device, a plurality of display control devices and a plurality of display devices, at least two of the display devices having different characteristics, each display control device of the plurality of display control devices being connected to the host device and to a respective display device, wherein the display data is processed in a display data processing pipeline receiving an initial input of coded display data at the host device and generating a final output of rendered display data at each display control device for transmittal to a respective display device for display, the display data processing pipeline including a plurality of serially connected display data processing steps performed on the display data, the method comprising:
  determining, at the host device, the characteristics of each of the display devices connected to each of the display control devices to determine characteristics of the rendered display data to be transmitted from the final output of the display data processing pipeline to the particular display device;
  determining, at the host device, processing capabilities of each of the display control devices connected to the host device;
  determining, at the host device, based on at least the determined characteristics of the rendered display data required for a particular display device and on the processing capabilities of a particular display control device connected to the particular display device, a subset of the plurality of serially connected display data processing steps that are to be performed by the particular display control device, the subset ending at the final output;
  performing, at the host device, all the display data processing steps from the initial input to a display data processing step performed prior to the subset of the plurality of serially connected display data processing steps to generate part-processed data; and
  outputting, from the host device, the part-processed display data to the particular display control device to enable the particular display control device to perform the subset of the plurality of serially connected display data processing steps ending at the final output.

13. The method according to claim 12, wherein each display data processing step is performed on a corresponding display data processing engine executing a selected shader program.

14. The method according to claim 13, further comprising:
  determining, by the host device, a number of display data processing engines located on the particular display control device based on the processing capabilities of the particular display control device to determine the subset of the plurality of serially connected display data processing steps that are to be performed by the particular display control device.

15. The method according to claim 14, further comprising:
  selecting, by the host device, a shader program for each of the display data processing engines in the subset of the plurality of serially connected display data processing steps that are to be performed by the particular display control device; and
  transmitting, by the host device, either instructions to the particular display control device to control the particular display control device to execute the selected shader program on the corresponding display data processing engine to process the display data, or the selected shader program to the particular display control device if the particular display control device does not already have the selected shader program stored in memory.

16. The method according to claim 12, further comprising:
  transmitting, by the display control device to the host device, the characteristics of the display device connected to the display control device to enable the host device to determine characteristics of the rendered display data to be transmitted from the final output of the display data processing pipeline to the particular display device;
  transmitting, by the display control device to the host device, the processing capabilities of the display control device;
  receiving, by the display control device from the host device, the information regarding the subset of the plurality of serially connected display data processing steps that are to be performed by the display control device;
  receiving, by the display control device from the host device, the part-processed display data;
  performing, by the display control device, the display data processing steps in the subset of the plurality of serially connected display data processing steps on the part-processed display data to generate the rendered display data; and
  transmitting, by the display control device, the rendered display data to the display device connected to the display control device.

17. The method according to claim 16, further comprising:
  receiving, at the display control device, the instructions from the host device to execute the selected shader program on the corresponding display data processing engine to process the display data.

18. The method according to claim 17, further comprising:
  receiving, at the display control device, the selected shader program from the host device if the display control device does not already have the selected shader program stored in memory.

19. The method according to claim 12, further comprising compressing the part-processed display data prior to outputting it to the particular display control device in compressed form, and wherein the method further comprises:
- determining available compression methods for part-processed data at different display data processing steps in the host device and the amount of compressed part-processed display data that would be output if part-processed data at different display data processing steps in the host device were compressed according to different available compression methods; and
- utilising the knowledge of the amount of compressed part-processed display data that would be output from different display data processing steps in the host device compressed according to different available compression methods when determining the subset of the plurality of serially connected display data processing steps that are to be performed by the particular display control device.

20. A non-transitory computer readable medium including executable instructions which, when executed in a processing system, cause the processing system to perform all the steps of a method according to claim 12.

\* \* \* \* \*